(12) United States Patent
Chen

(10) Patent No.: US 10,444,568 B2
(45) Date of Patent: Oct. 15, 2019

(54) PIXEL STRUCTURE OF LIQUID CRYSTAL DISPLAY PANEL AND DISPLAY DEVICE USING SAME

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 15/735,297

(22) PCT Filed: Feb. 26, 2017

(86) PCT No.: PCT/CN2017/074909
§ 371 (c)(1),
(2) Date: Dec. 11, 2017

(87) PCT Pub. No.: WO2018/120393
PCT Pub. Date: Jul. 5, 2018

(65) Prior Publication Data
US 2019/0011751 A1    Jan. 10, 2019

(30) Foreign Application Priority Data
Dec. 30, 2016    (CN) .......................... 2016 1 1259738

(51) Int. Cl.
*G02F 1/1343*    (2006.01)
*G02F 1/1337*    (2006.01)
(Continued)

(52) U.S. Cl.
CPC ........ *G02F 1/13363* (2013.01); *G02F 1/1368* (2013.01); *G02F 1/133371* (2013.01);
(Continued)

(58) Field of Classification Search
CPC ............. G02F 1/133555; G02F 1/1333; G02F 1/133371; G02F 1/134363; G02F 1/1337;
(Continued)

(56) References Cited

U.S. PATENT DOCUMENTS 5,467,121 A    11/1995  Allcock
2009/0091587 A1*  4/2009  Kim .................. G02F 1/134363
345/690

(Continued)

FOREIGN PATENT DOCUMENTS

CN    101089692 A    12/2007
CN    101510022 A    8/2009
(Continued)

*Primary Examiner* — Thoi V Duong
(74) *Attorney, Agent, or Firm* — Muncy, Geissler, Olds & Lowe, P.C.

(57) ABSTRACT

This application relates to a pixel structure of a liquid crystal display panel and a display device using same, including: a plurality of pixel units, each of the pixel units includes a first light penetration area, a second light penetration area, and a third light penetration area, and a transmitting effects of the pixel units are distinguished according to different retardations and an area ratio.

16 Claims, 10 Drawing Sheets

(51) Int. Cl.
*G02F 1/13363* (2006.01)
*G02F 1/1335* (2006.01)
*G02F 1/1368* (2006.01)
*G02F 1/1333* (2006.01)
*G09G 3/00* (2006.01)
*G02F 1/1362* (2006.01)

(52) U.S. Cl.
CPC .. *G02F 1/133528* (2013.01); *G02F 1/134363* (2013.01); *G09G 3/00* (2013.01); *G02F 1/133707* (2013.01); *G02F 2001/134345* (2013.01); *G02F 2001/136236* (2013.01); *G02F 2203/30* (2013.01)

(58) Field of Classification Search
CPC ............. G02F 1/133707; G02F 1/1343; G02F 1/134309; G02F 2001/133638; G02F 2001/133757; G02F 2001/13712; G02F 2001/133742; G02F 2001/134318; G02F 2001/134345; G02F 2001/134372; G02F 2001/134381; G02F 2413/09; G02F 2201/12; G02F 1/13363; G02F 1/1368; G02F 1/133528; G02F 2001/136236; G02F 2203/30; G09G 3/00
See application file for complete search history.

(56) References Cited

U.S. PATENT DOCUMENTS

| | | | |
|---|---|---|---|
| 2014/0104523 A1* | 4/2014 | Jung | ..................... G02F 1/1343 349/41 |
| 2014/0211142 A1* | 7/2014 | Kim | .................. G02F 1/133707 349/138 |
| 2016/0097957 A1* | 4/2016 | Yun | .................. G02F 1/133371 349/42 |

FOREIGN PATENT DOCUMENTS

| | | |
|---|---|---|
| CN | 102289108 A | 12/2011 |
| CN | 105759486 A | 7/2016 |
| CN | 106873216 A | 6/2017 |
| CN | 106873217 A | 6/2017 |

* cited by examiner

PIXEL STRUCTURE OF LIQUID CRYSTAL DISPLAY PANEL AND DISPLAY DEVICE USING SAME

BACKGROUND

Technical Field

This application relates to a design method for alleviating color shift problems of a liquid crystal display panel, and in particular, to a pixel structure of a liquid crystal display panel and a display device using same.

Related Art

A liquid crystal display panel usually includes a color filter substrate (CF), a thin film transistor array substrate (TFT Array Substrate), and a liquid crystal layer (LC Layer) is configured between the two substrates, and the working principle thereof is controlling rotation of liquid crystal molecules of a liquid crystal layer by applying a drive voltage to two glass substrates and reflecting light rays of a backlight module to generate an image. According to different liquid crystal orientations, liquid crystal display panels in the current mainstream market may be grouped into the following several types: vertical alignment (VA) type, twisted nematic (TN) or super twisted nematic (STN) type, in-plane switching (IPS) type, and fringe field switching (FFS) type.

Liquid crystal display of the vertical alignment (VA) mode is, for example, a patterned vertical alignment (PVA) type liquid crystal display or multi-domain vertical alignment (MVA) type liquid crystal display device. In the PVA type, an effect of a wide visual angle is implemented according to a fringe field effect and a compensation plate. In the MVA type, a pixel into a plurality of areas and liquid crystal molecules located at different areas are enabled to incline towards different directions according to a protrusion or a particular pattern structure, to achieve an objective of implementing a wide visual angle and improving a transmittance.

In an IPS mode or an FFS mode, liquid crystal molecules are enabled to respond in a direction parallel to a substrate plane by applying an electric field containing a component basically parallel to a substrate, to drive liquid crystal molecules. An IPS type liquid crystal display panel and an FFS type liquid crystal display panel have advantages of a wide visual angle. However, because the wavelength of blue light is relatively short, compared with red light and green light, the blue light needs a smaller retardation to achieve a same transmittance, and transmittance-voltage (V-T) curves of the red light, green light, and blue light are different. In addition, transmittances of the red light, the green light, and the blue light in film surfaces, such as a polyimide (PI) film, a planarization layer (PFA), and a coating layer (OC), in a panel are different, and consequently, a color shift problem occurs.

In an MVA mode, in most cases, a pixel is divided into a bright region and a dark region at present, and therefore may be mixed by two V-T characteristics in optical performances. Moreover, a whiting problem of a middle gray scale may be effectively suppressed in a case of a large visual angle by appropriately adjusting an area ratio of the bright region to the dark region.

SUMMARY

To resolve the foregoing technical problem, an objective of this application is to provide a design method for alleviating color shift problems, and in particular, relates to a pixel structure of a liquid crystal display panel and a display device using same, so as to effectively resolve color shift problems and effectively improve a pixel design aperture ratio.

The objective of this application and resolving of the technical problem are implemented according to the following technical solution. A pixel structure of a liquid crystal display panel provided in this application includes: a plurality of pixel units, where each of the pixel units includes at least one light penetration area, and a light penetration effects of the pixel units are distinguished according to different retardations and an area ratio.

The objective of this application and resolving of the technical problem are further implemented according to the following technical measurements.

A liquid crystal display panel includes: a first substrate; a second substrate, disposed opposite to the first substrate; and a liquid crystal layer, disposed between the first substrate and the second substrate. The liquid crystal display panel further includes: a pixel structure of the liquid crystal display panel, disposed on the first substrate or the second substrate. Moreover, the liquid crystal display panel further includes: a first polarizer, disposed on an outer surface of the first substrate, and a second polarizer, disposed on an outer surface of the second substrate, where polarization directions of the first polarizer and the second polarizer are parallel to each other.

A display device includes a backlight module and further includes the liquid crystal display panel.

In an embodiment of this application, the pixel unit is equivalently divided into at least 12 regions according to different phase difference factors.

In an embodiment of this application, the pixel unit is equivalently divided into at least 12 regions according to different gradient terrain factors of a protection layer.

In an embodiment of this application, the protection layer etching process is performed according to a half tone craft process.

In an embodiment of this application, a first light penetration area includes four main light transmitting areas, a second light penetration area includes four secondary light transmitting areas, and a third light penetration area includes four secondary second light transmitting areas.

In an embodiment of this application, the 12 regions are divided into three different gradient terrain depths, the pixel structure is divided according to the three different gradient terrain depths, such that an inner layer is a rhombus, a middle layer is a rhombus, and an outer layer is a triangle, a pixel electrode covers the pixel structure, and a slit design is reserved.

In an embodiment of this application, the 12 regions are divided into three different gradient terrain depths, the pixel structure is divided according to the three different gradient terrain depths, such that an inner layer, a middle layer, and an outer layer are all rectangles, a pixel electrode covers the pixel structure, and a slit design is reserved.

In an embodiment of this application, the pixel structure further includes a thin film transistor, configured to drive the whole pixel unit.

Beneficial effects of this application are effectively resolving color shift problems of the liquid crystal display panel and alleviating a whiting problem at a large visual angle.

DETAILED DESCRIPTION

Figure 1A:
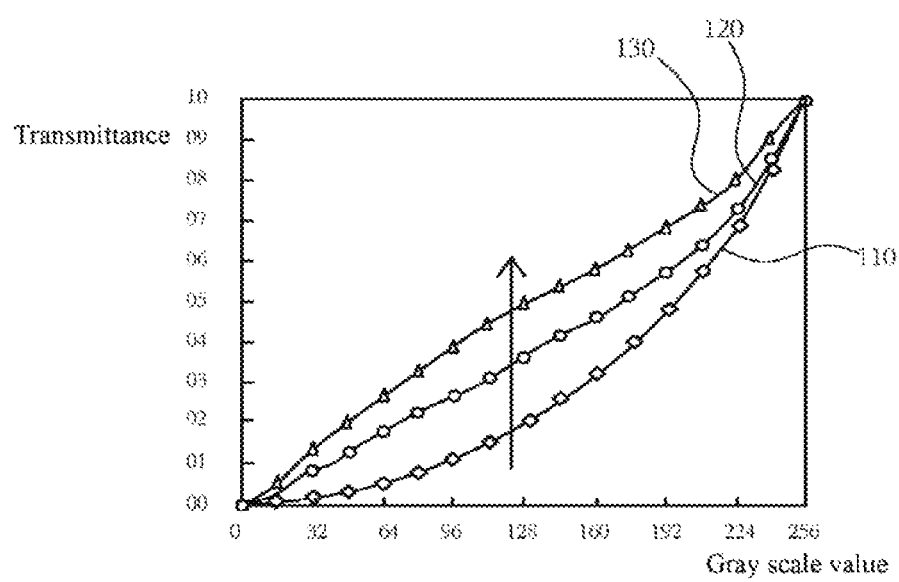
FIG. 1a shows transmittance-gray scale value curves corresponding to color shift angles when a vertical alignment liquid crystal display device is at visual angles of 0 degree, 45 degrees, and 60 degrees according to an embodiment of this application.

The following embodiments are described with reference to accompany drawings, and are used to exemplarily show particular embodiments that can be implemented and that is in this application. Direction terms mentioned in this application, such as "upper", "lower", "front", "rear", "left", "right", "inner", "outer", and "side" are only directions with reference to the accompanying drawings. Therefore, the used direction terms are used to describe and explain this application, and are not used to limit this application.

The accompany drawings and description are considered to be substantially exemplary, and are not intended for limitation. In the drawings, units with similar structures are represented by same numerals. In addition, to facilitate understanding and description, a size and a thickness of each component shown in the accompany drawings are arbitrarily shown, and this application is not limited thereto.

In the accompany drawings, for a clearance purpose, a thickness of a layer, a film, a panel, an area, or the like is magnified. In the accompany drawings, to facilitate understanding and description, thicknesses of some layers and areas are magnified. It should be understood that when a component, for example, a layer, a film, an area, or a substrate, is described as "being located on" another component, the component may be directly located on the another component, or there is an intermediate component.

In addition, in the specification, unless clearly described as an opposite meaning, a word "include" is understood as including the component but not excluding any other components. In addition, in the specification "being located on . . . " refers to being located above or below a target component but does not refer to having to be located on a top based on a gravity direction.

To further state technical means used in this application for achieving a predetermined invention objective and effects of this application, with reference to the accompany drawings and preferred embodiments, the following describes in details specific implementation manners, structures, features, and effects of a pixel structure of a liquid crystal display panel and a display device using same are proposed in this application.

A liquid crystal display device of this application may include a backlight module and a liquid crystal display panel. The liquid crystal display panel may include a thin film transistor (TFT) substrate, a color filter (CF) substrate, and a liquid crystal layer formed between the two substrates.

In an embodiment, the liquid crystal display panel of this application may be a display panel with a curved surface, and the liquid crystal display device of this application may be a display apparatus with a curved surface.

In an embodiment, the thin film transistor (TFT) or another active switch and the color filter (CF) of this application may be formed on a same substrate.

FIG. 1a shows transmittance-gray scale value curves corresponding to color shift angles when a vertical alignment liquid crystal display device is at visual angles of 0 degree, 45 degrees, and 60 degrees. Referring to FIG. 1a, FIG. 1a shows a transmittance-gray scale value curve 110 corresponding to a color shift visual angle at 0 degree, a transmittance-gray scale value curve 120 corresponding to a color shift visual angle at 45 degrees, and a transmittance-gray scale value curve 130 corresponding to a color shift visual angle at 60 degrees. Therefore, a higher a brightness transmittance is obtained along with a higher color shift visual angle in a same gray scale value.

Figure 1B:
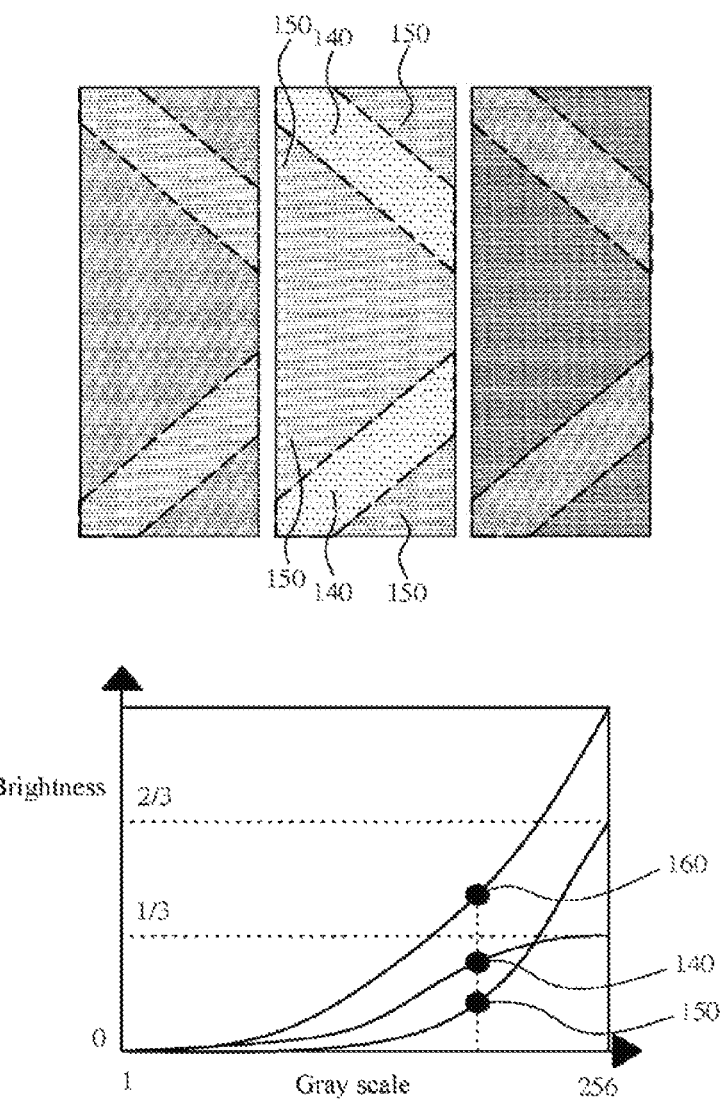
FIG. 1b shows brightness-gray scale curves corresponding to two color shift angles and an improved color shift angle mixing the two according to an embodiment of this application.

FIG. 1b shows brightness-gray scale curves corresponding to two color shift angles and an improved color shift angle mixing the two. Referring to FIG. 1b, in an MVA mode, a pixel may be divided into a bright region and a dark region, and therefore may be mixed by two V-T characteristics in optical performances. Moreover, a whiting problem of a middle gray scale may therefore be effectively suppressed by approximately adjusting an area ratio of the bright region to the dark region at a large visual angle. A bright region pixel 140 and a dark region pixel 150 are mixed and adjusted to form a pixel 160 in a brightness-gray scale pattern.

Figure 2:
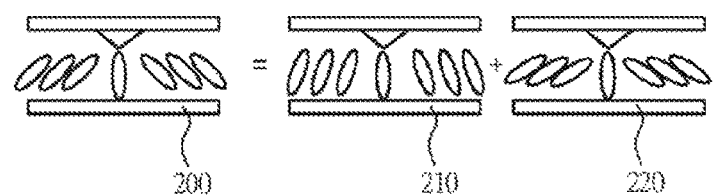
FIG. 2 is a mixed low color shift area model according to an embodiment of this application.

FIG. 2 is a mixed low color shift area model. Referring to FIG. 2, the main principle of a common low color shift technology is further cutting conventional four areas into eight areas according to a voltage division or extra driving manner. Therefore, there is an effect of multi-category compensation during viewing at a large visual angle. For example, a secondary low color shift area 210 and a main low color shift area 220 are mixed to form the low color shift area 200.

Figure 3:
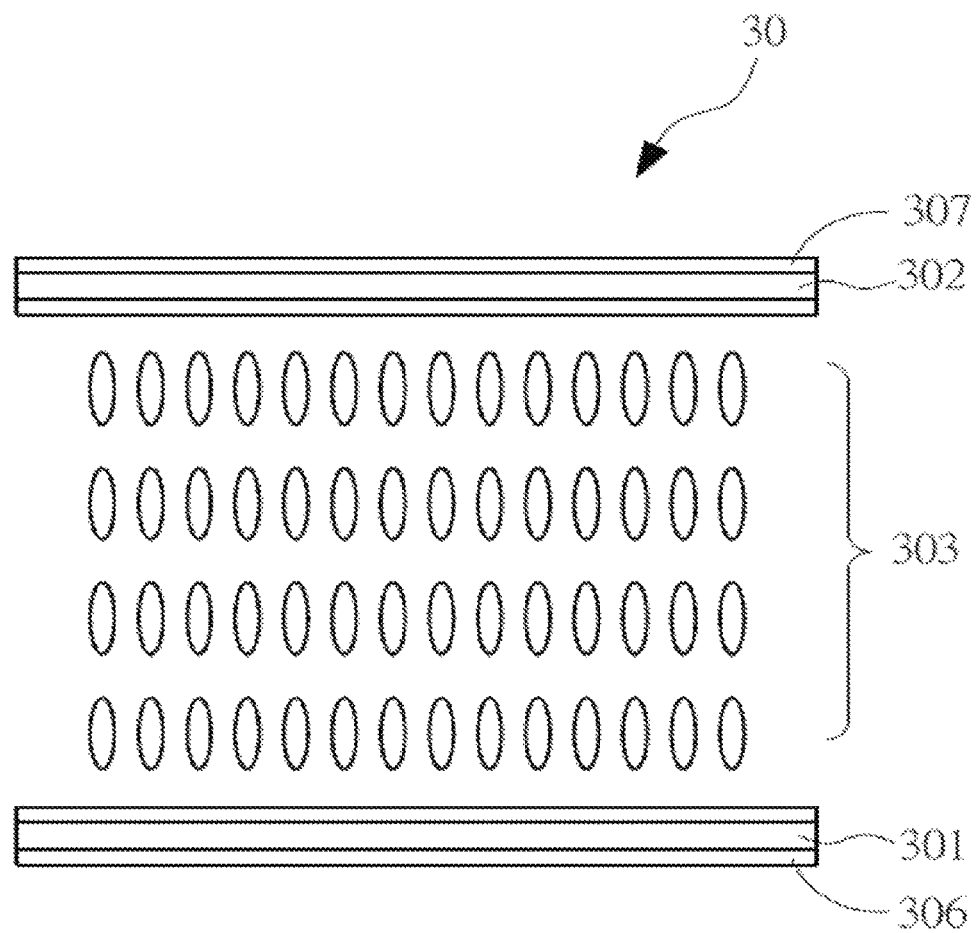
FIG. 3 is a schematic diagram of a liquid crystal display panel according to an embodiment of this application.
Figure 3A:
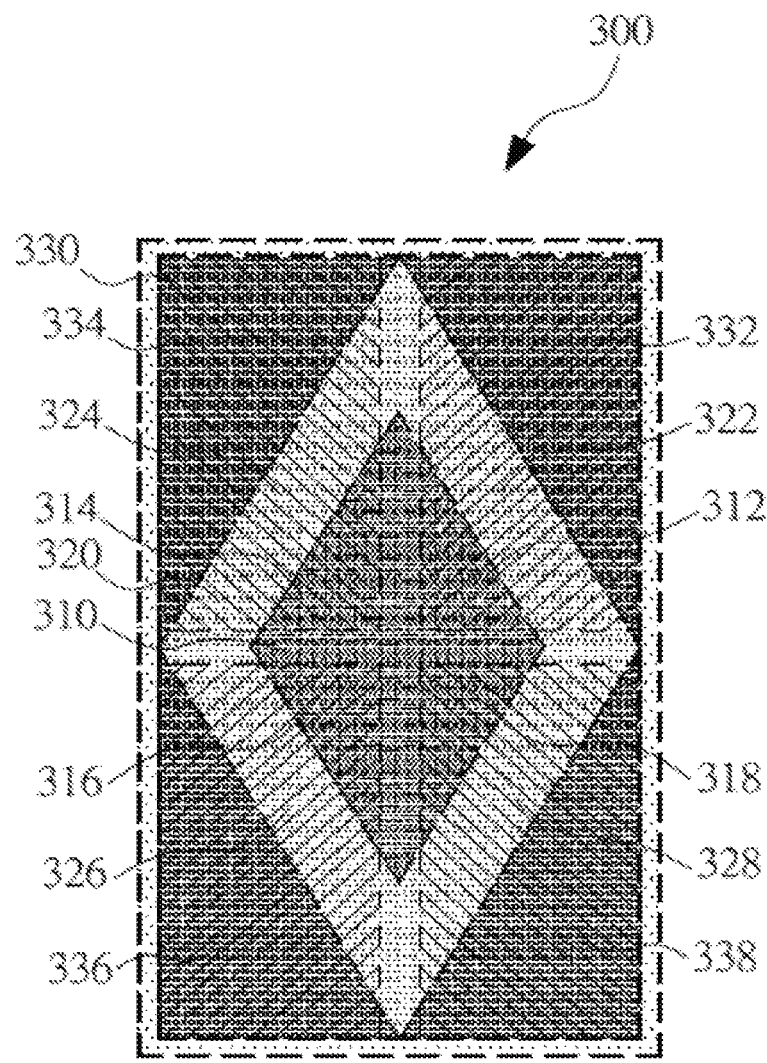
FIG. 3a is a schematic diagram of 12 pixel regions of a pixel structure of a liquid crystal display panel according to an embodiment of this application.

FIG. 3 is a schematic diagram of a liquid crystal display panel 30 according to an embodiment of this application, and FIG. 3a is a schematic diagram of 12 pixel regions of a pixel structure of a liquid crystal display panel according to an embodiment of this application. Referring to FIG. 3 and FIG. 3a, in an embodiment of this application, the liquid crystal display panel 30 includes: a first substrate 301 (for example, a thin film transistor substrate); a second substrate 302 (for example, a color filter substrate), disposed opposite to the first substrate 301; and a liquid crystal layer 303, disposed between the first substrate 301 and the second substrate 302. The liquid crystal display panel 30 further includes the pixel structure for alleviating color shift, disposed between the first substrate and the second substrate (for example, located on a surface of the first substrate), and the liquid crystal layer 303 includes: a plurality of pixel units 300. Each of the pixel units 300 consists of a first light penetration area 310, a second light penetration area 320, and a third light penetration area 330, and a light penetration effects of the pixel units are distinguished according to different retardations and a area ratio, and the pixel units 300 are disposed between the first substrate 301 and the second substrate 302. In addition, the liquid crystal display panel 30 further includes a first polarizer 306 disposed on an outer surface of the first substrate 301 and a second polarizer 307 disposed on an outer surface of the second substrate 302. Polarization directions of the first polarizer 306 and the second polarizer 307 are parallel to each other. The pixel structure of the liquid crystal display panel is disposed in a liquid crystal display device in a vertical alignment mode.

In an embodiment of this application, the display device of this application includes a backlight module and further includes a liquid crystal display panel 30. The liquid crystal display panel 30 includes: a first substrate 301 (for example, a thin film transistor substrate); a second substrate 302 (for example, a color filter substrate), disposed opposite to the first substrate 301; and a liquid crystal layer 303, disposed between the first substrate 301 and the second substrate 302. The liquid crystal display panel 30 further includes a pixel structure of the liquid crystal display panel, where the pixel structure is disposed on the first substrate and the second substrate (for example, located on a surface of the first substrate), and includes: a plurality of pixel units 300. Each of the pixel units 300 consists of a first light penetration area 310, a second light penetration area 320, and a third light penetration area 330, and light penetration effects of the pixel units are distinguished according to different retardations and a area ratio, and the pixel units 300 are disposed between the first substrate 301 and the second substrate 302. Moreover, the liquid crystal display panel 30 further includes: a first polarizer 306, disposed on an outer surface of the first substrate 301; and a second polarizer 307, disposed on an outer surface of the second substrate 302. Polarization directions of the first polarizer 306 and the second polarizer 307 are parallel to each other.

Referring to FIG. 3a, in an embodiment of this application, the pixel structure includes the pixel units 300. Each of the pixel units 300 consists of a first light penetration area 310 (including four main light transmitting areas 312, 314, 316, and 318), a second light penetration area 320 (including four secondary light transmitting areas 322, 324, 326, and 328), and a third light penetration area 330 (including four secondary second light transmitting areas 332, 334, 336, and 338). The three regions are constructed by distinguishing pixel units effects according to different depths and an area ratio.

Figure 3B:
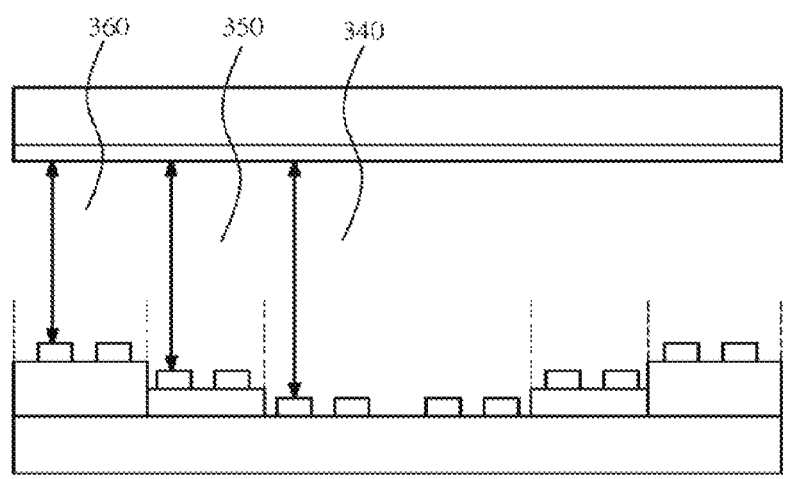
FIG. 3b shows retardations of three liquid crystal layers of a pixel structure of a liquid crystal display panel according to an embodiment of this application.

FIG. 3b shows retardations of three liquid crystal layers of a pixel structure of a liquid crystal display panel according to an embodiment of this application. In an embodiment of this application, in the first pixel light zone unit 300, the pixel may be equivalently divided into 12 regions according to different gradient terrain factors of retardations □nd (including three retardations 340, 350, and 360).

Figure 4A:
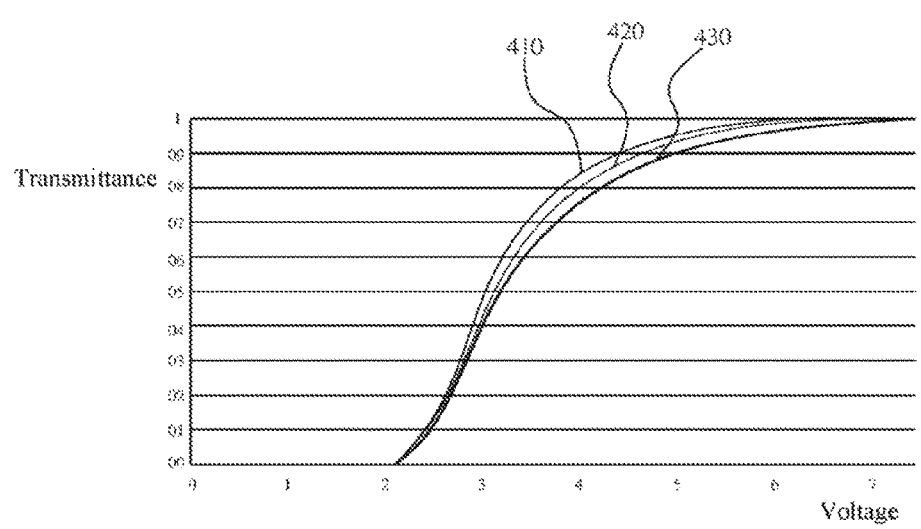
FIG. 4a illustrates three GAMMA curves according to a transmittance-voltage curve according to an embodiment of this application.

FIG. 4a illustrates three GAMMA curves according to a transmittance-voltage curve according to an embodiment of this application. Referring to FIG. 4a, FIG. 4a shows a transmittance-voltage value curve 410 corresponding to 3.6 liquid crystal layer gap (Cell Gap), a transmittance-voltage value curve 420 corresponding to a 3.9 liquid crystal layer gap (Cell Gap), and a transmittance-voltage value curve 430 corresponding to a 4.2 liquid crystal layer gap (Cell Gap).

Figure 4B:
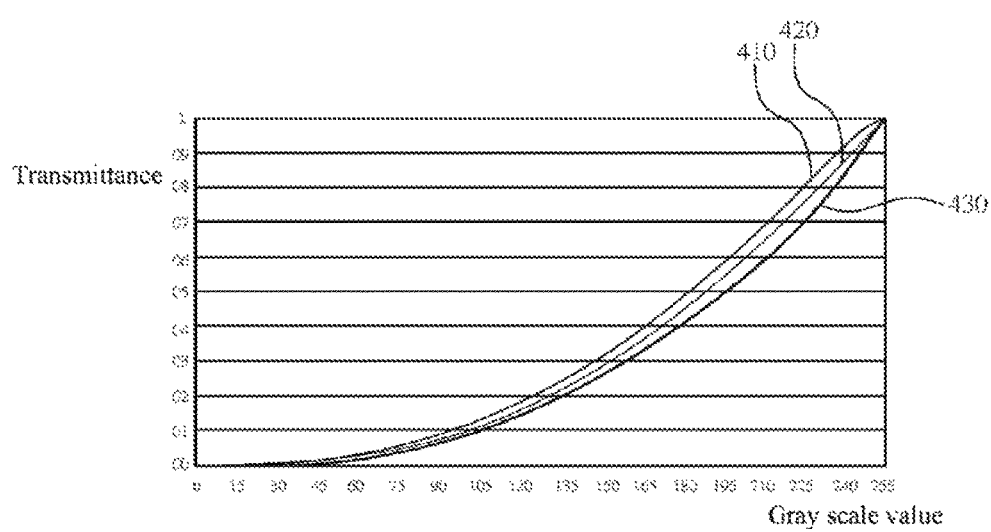
FIG. 4b illustrates three GAMMA curves according to a transmittance-gray scale value according to an embodiment of this application.

FIG. 4b illustrates three GAMMA curves according to a transmittance-gray scale value according to an embodiment of this application. Referring to FIG. 4b, FIG. 4b shows a transmittance-voltage gray scale value 410 corresponding to 3.6 liquid crystal layer gap (Cell Gap), a transmittance-gray scale value curve 420 corresponding to a 3.9 liquid crystal layer gap (Cell Gap), and a transmittance-gray scale value curve 430 corresponding to a 4.2 liquid crystal layer gap (Cell Gap).

Figure 5:
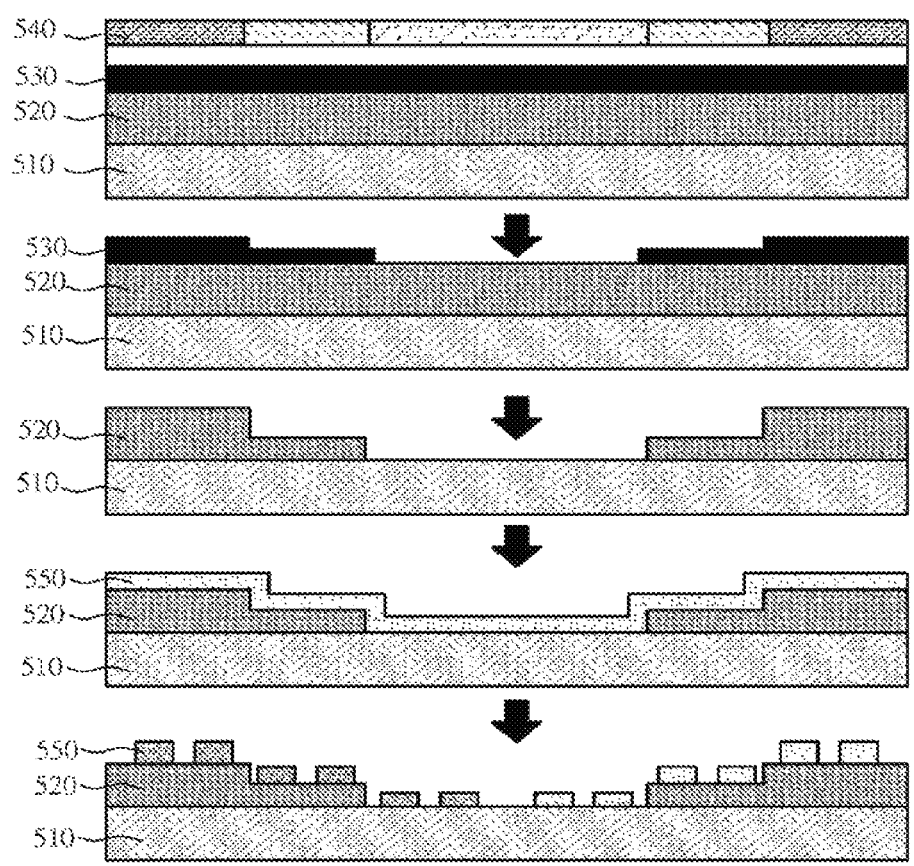
FIG. 5 is a schematic diagram of manufacturing a pixel structure with a gradient shape according to a half tone (Half Tone) craft process according to an embodiment of this application.

FIG. 5 is a schematic diagram of manufacturing a pixel structure with a gradient shape according to a half tone (Half Tone) process of this application. Referring to FIG. 5, in an embodiment of this application, the protection layer etching process is performed according to a half tone craft process. Moreover, pixel distinguishing effects are caused according to different gradient terrains within a liquid crystal box, so as to replace a conventional voltage division manner. For example, the first substrate has a four-layer structure and includes: a transparent substrate (SB) layer 510, a protection layer 520, a photoresist material (PR) layer 530, and an indium tin oxide (ITO) layer 550. In addition, a film forming step, an exposure step, a developing step, an etching step, and a film stripping step need to be conducted, and the process needs to be repeated five times to complete the substrate. The film forming step is covering a film (the protection layer 520, the photoresist material layer 530, and the indium tin oxide layer 550) of a needed material on a glass substrate 510. The explosion step is developing a pattern of a needed photoresist 530 on the photoresist 530 according to a photomask 540. The developing step is leaving a part of the photoresist 530 having the pattern of the photoresist 530 in a previous stage. The etching step is etching a needed pattern on the substrate 510 on which the pattern of the photoresist 530 already exists. The film stripping step is removing, according to the etched substrate 510 with the needed pattern, the photoresist 530 covering the pattern, for subsequent operating.

Figure 6:
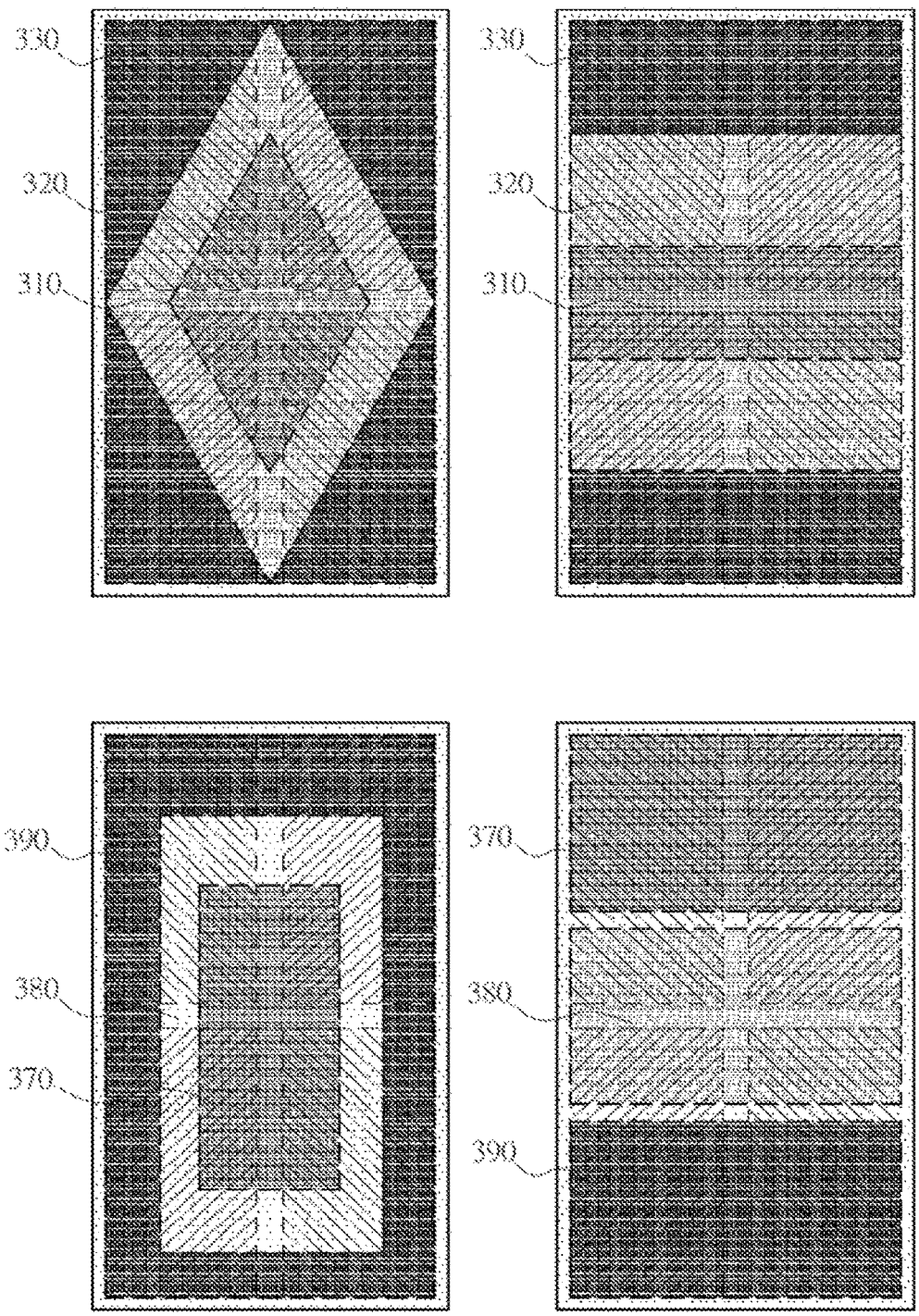
FIG. 6 is a schematic diagram of 12 regions formed by three retardations according to an embodiment of this application.

FIG. 6 is a schematic diagram of 12 regions formed by three retardations according to an embodiment of this application. Referring to FIG. 6, in an embodiment of this application, the 12 pixel regions are grouped into three different gradient terrain depths, the pixel structure is divided according to the three different gradient terrain depths, such that an inner layer is a rhombus 310, a middle layer is a rhombus 320, and an outer layer is a triangle 330, a pixel electrode covers the pixel structure, and a slit design is reserved.

In an embodiment of this application, the 12 pixel regions are grouped into three different gradient terrain depths, the pixel structure is divided according to the three different gradient terrain depths, such that an inner layer, a middle layer, and an outer layer are all rectangles (370, 380, and 390), a pixel electrode covers the pixel structure, and a slit design is reserved.

In an embodiment of this application, the pixel of the liquid crystal display panel further includes an active switch, for example, a thin film transistor, configured to drive the whole pixel.

Beneficial effects of this application are effectively resolving a color shift problem of the liquid crystal display panel and alleviating a whiting problem at a large visual angle.

Phases such as "in some embodiments" and "in the embodiments" are repeatedly used. The phases usually do not refer to the same embodiments but may also refer to the same embodiments. Words such as "contain", "have", and "include" are synonyms unless other meanings are indicated in the context of the words.

The above descriptions are merely preferred embodiments of this application, and are not intended to limit this application in any form. Although this application has been disclosed above through the preferred embodiments, the embodiments are not intended to limit this application. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

What is claimed is:

1. A pixel structure of a liquid crystal display panel, comprising:
   a plurality of pixel units, wherein each of the pixel units comprises at least one light penetration area, and a light penetration effects of the pixel units are distinguished according to different retardations and an area ratio,
   wherein the pixel unit is equivalently divided into at least 12 regions according to different gradient terrain factors of a protection layer, the 12 regions are grouped into three different gradient terrain depths, the pixel structure is divided according to the three different gradient terrain depths including an inner layer, a middle layer and an outer layer, a pixel electrode covers the pixel structure, and a slit design is reserved.

2. The pixel structure of a liquid crystal display panel according to claim 1, wherein in the pixel unit is equivalently divided into at least 12 regions according to different phase difference factors.

3. The pixel structure of a liquid crystal display panel according to claim 1, wherein a protection layer etching process is performed according to a half tone process.

4. The pixel structure of a liquid crystal display panel according to claim 1, wherein the light penetration area comprising a first light penetration area including four main light penetration areas, a second light penetration area including four secondary light penetration areas, and a third light penetration area including four secondary second light penetration areas.

5. The pixel structure of a liquid crystal display panel according to claim 1, wherein the inner layer is a rhombus, the middle layer is a rhombus, and the outer layer is a triangle.

6. The pixel structure of a liquid crystal display panel according to claim 1, wherein the the inner layer, the middle layer, and the outer layer are all rectangles.

7. The pixel structure of a liquid crystal display panel according to claim 1, further comprising a thin film transistor, configured to drive the whole pixel unit.

8. A liquid crystal display panel, comprising:
   a first substrate;
   a second substrate, disposed opposite to the first substrate;
   a liquid crystal layer, disposed between the first substrate and the second substrate; and
   a first polarizer, disposed on an outer surface of the first substrate, and a second polarizer, disposed on an outer surface of the second substrate, wherein polarization directions of the first polarizer and the second polarizer are parallel to each other,
   wherein a pixel structure of the liquid crystal display panel, disposed on the first substrate or the second substrate and comprises: a plurality of pixel units, the pixel unit is equivalently divided into at least 12 regions according to different gradient terrain factors of a protection layer, the 12 regions are grouped into three different gradient terrain depths, the pixel structure is divided according to the three different gradient terrain depths including an inner layer, a middle layer and an outer layer, a pixel electrode covers the pixel structure, and a slit design is reserved.

9. The liquid crystal display panel according to claim 8, wherein each of the pixel units comprises at least one light penetration area, and a light penetration effects of the pixel units are distinguished according to different retardations and an area ratio.

10. The liquid crystal display panel according to claim 9, wherein the pixel unit is equivalently divided into at least 12 regions according to different phase difference factors.

11. The liquid crystal display panel according to claim 9, further comprising a first light penetration area including four main light penetration areas, a second light penetration area including four secondary light penetration areas, and a third light penetration area including four secondary second light penetration areas.

12. The liquid crystal display panel according to claim 9, further comprising a thin film transistor, configured to drive the whole pixel unit.

13. The liquid crystal display panel according to claim 8, wherein a protection layer etching process is performed according to a half tone process.

14. The liquid crystal display panel according to claim 8, wherein the inner layer is a rhombus, the middle layer is a rhombus, and the outer layer is a triangle.

15. The liquid crystal display panel according to claim 8, wherein the inner layer, the middle layer, and the outer layer are all rectangles.

16. A pixel structure of a liquid crystal display panel, comprising:
   a plurality of pixel units, wherein each of the pixel units comprises at least one light penetration area, and a light penetration effects of the pixel units are distinguished according to different retardations and an area ratio, wherein
   the pixel unit is equivalently divided into at least 12 regions according to different phase difference factors;
   the pixel unit is equivalently divided into at least 12 regions according to different gradient terrain factors of a protection layer;
   the 12 regions are grouped into three different gradient terrain depths, the pixel structure is divided according to the three different gradient terrain depths, such that an inner layer is a rhombus, a middle layer is a rhombus, and an outer layer is a triangle, a pixel electrode covers the pixel structure, and a slit design is reserved.

* * * * *